H. W. HOWLAND.
CROSSCUT BAND SAW.
APPLICATION FILED JULY 17, 1917.
1,291,002.
Patented Jan. 14, 1919.
2 SHEETS—SHEET 1.
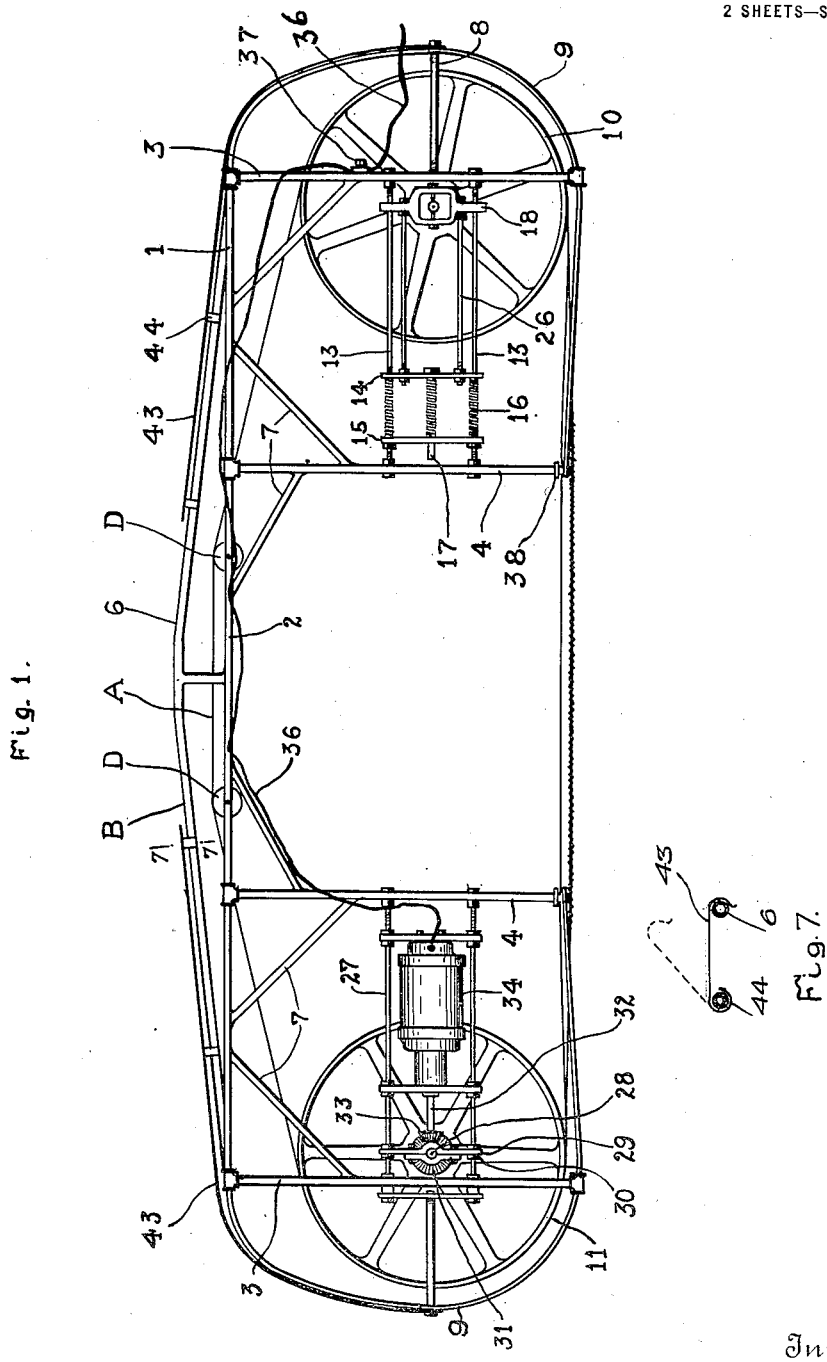
Inventor
H. W. HOWLAND
By his Attorney Jesse R. Stone H. W. HOWLAND.
CROSSCUT BAND SAW.
APPLICATION FILED JULY 17, 1917.
1,291,002.
Patented Jan. 14, 1919.
2 SHEETS—SHEET 2.
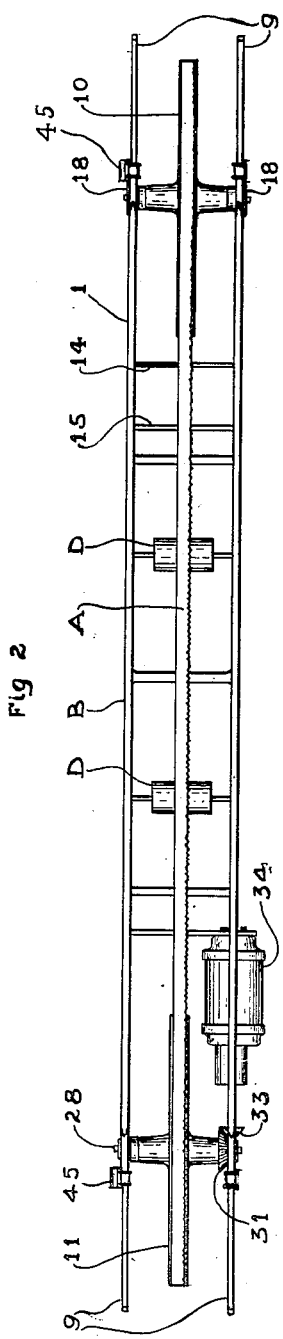
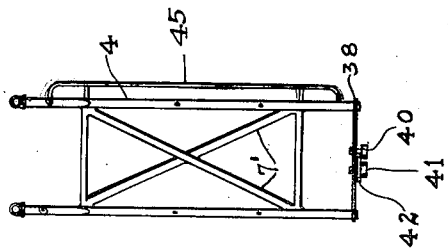
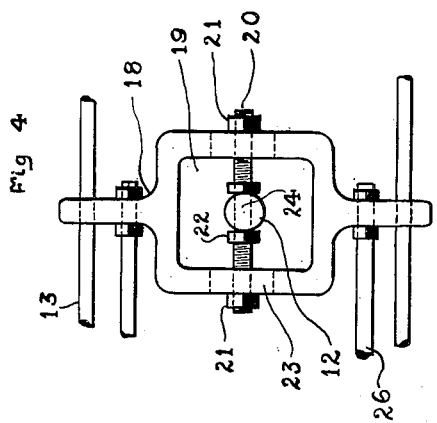
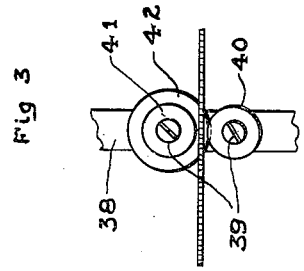
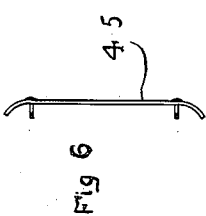
H. W. HOWLAND Inventor
By his Attorney Jesse R. Stone

UNITED STATES PATENT OFFICE.

HARRY W. HOWLAND, OF NACOGDOCHES, TEXAS.

CROSSCUT BAND-SAW.

1,291,002.  Specification of Letters Patent.  Patented Jan. 14, 1919.

Application filed July 17, 1917. Serial No. 181,017.

*To all whom it may concern:*

Be it known that I, HARRY W. HOWLAND, a citizen of the United States, residing at Nacogdoches, Nacogdoches county, Texas, have invented a certain new and useful Improvement in Crosscut Band-Saws, of which the following is a full, clear, and exact description, such as will enable others skilled in the art to which it appertains to make and use the same.

My invention relates to an improvement in band crosscut saws, but more particularly to saws of the portable type used in lumbering in the woods.

The principal object of my invention is to provide a power-driven crosscut saw adapted to be easily portable by two men from tree to tree in the woods, and which may be operated in any position.

Another object is to provide a portable band crosscut saw with the motor mounted in the frame of the saw with the cutting edge of the saw presented outwardly in the plane of the frame.

Another object is to provide a portable power-driven crosscut saw which will be light in structure and yet adapted to cut trees of large diameter.

Another object is to provide pulleys for the saw which are readily adjustable on their mountings to allow the saw to run true and tight in its operation.

Other objects and desirable features will more clearly appear in the specification which follows and will be clearly pointed out in the claims hereto appended.

In cutting trees in the woods for lumber it is the common method to use the hand operated reciprocating saw to sever the tree, and to then cut up the fallen tree to the proper length by use of this same means. This process necessitates the labor of two men for each saw and is slow and laborious. Furthermore, in the practice of the common method the tree is severed from the stump several feet above the ground, thereby wasting a valuable portion of the tree.

My invention contemplates the use of a power-driven band saw to avoid the difficulties of the present method. This saw is mounted on a light metal framework and has a motor seated in the frame. The motor is light in structure and operates with equal facility in all positions of the frame. The saw operates with great rapidity, making it possible for two men with the help of this device to perform the work of six men with the old saws. Furthermore, by the use of my invention, the tree may be severed within a few inches of the ground, thereby saving a valuable portion of the tree hitherto wasted.

For further disclosure of my invention, attention is directed to the drawing forming a part of this description, and in which Figure 1 shows a side view of the invention; Fig. 2 is a top plan view; Fig. 3 is a detail of the guide pulleys for the saw; Fig. 4 is a detailed view of the pulley adjustment; Fig. 5 is a detail showing the method of bracing the frame; Fig. 6 is a detail of the skid, 45. Fig. 7 is a detail illustrating the manner of hinging a protecting member 43.

Like characters of reference refer to like parts throughout the different views. The drawing illustrates the preferred embodiment of my invention, but it is obvious that many modifications may be made in this structure without departing from the spirit of my invention. The band saw, A, is a flat endless saw blade of common construction passing over two large end pulleys, 10 and 11, one mounted at each end of the light, longitudinal, metal frame, B.

The frame, B, comprises two flat frames of tubing, or any other light metal construction, spaced apart somewhat, and together making up the double frame, B, between the two parts, 1, of which, the saw is mounted. Each of the two side members composing the same is made up of a longitudinal member, 2, connected at each end to transverse end pieces, 3, and a second transverse member, 4, spaced inwardly a short distance from the end. The longitudinal members, 2, are each reinforced by a truss member 6, which serves not only to strengthen the frame but also to help protect the saw, as will be later explained. The transverse members, 3 and 4, are connected to the longitudinal member by any well known means, but in my preferred embodiment I have welded the parts together. The transverse parts are further held firmly by the braces, 7.

At each end of the frame, midway of the end members, 3, is provided a supporting member, 8. These supports project beyond the outer end of the frame sufficiently to protect the working parts. They have attached to their outer ends a supporting rod or rocker, 9, curved to extend around the end of the frame, and to be attached on one end to the outer end of the transverse members, 3 and 4, and on the other end to the longitudinal member, 2, of which it is an extension. These curved rockers serve as a support on which to rest the frame in the operation of the device, and also as handles by which the machine may be moved. They further serve to strengthen the framework.

On the longitudinal frame member, and between the two interior transverse members, 4, are mounted two rollers or pulleys, D, which serve to support the saw out of the way of the tree being sawed. These small pulleys extend across between the two longitudinal members of the frame and are rotatably journaled therein.

Large pulleys are journaled at each end of the frame, the pulley, 10, at the rear end, being adjustable relative to the other pulley, and also to the frame. It is rotatably mounted on the fixed axis, 12, which is supported adjustably, as will now appear. At this end of the frame are four supporting and bracing rods, 13, which are bolted through the transverse frame members, 3 and 4, and spaced apart to furnish a support for two parallel flat plates, 14 and 15, which have openings to receive the four rods, 13. The plate, 14, is slidable on the rods, and has also a central rod, 17, which is fixed thereto, but is slidable through the opposite fixed plate 15, as may be plainly seen. Each of the rods, 13, and also the rod 17 are surrounded by a spiral spring, 16, serving to space the plates, 14 and 15, resiliently apart.

The pulley, 10, is rotatable on the shaft, 12, as previously set forth. The shaft, 12, is mounted at each end in a yoke, 18. This yoke has a central opening, 19, several times larger than is necessary to hold the shaft, 12. A horizontally disposed bolt, 20, passes through lateral slots, 23, in the yoke, and across said opening, 19, midway of the same. This bolt is threaded to receive at each end an adjusting nut, 21, the bolt being vertically adjustable in the slots, 23, as shown in Fig. 4. The shaft, 12, is provided with a horizontal opening, 24, through which the bolt, 20, passes. Adjusting nuts, 22, on each side of the shaft, 12, serve to hold the same in any desired position on the bolt, 20.

The yoke, 18, is provided at each end with holes to receive the cross-rods, 13, upon which the yoke is slidably mounted.

Each of the yokes, 18, is spaced fixedly from the plate, 14, by means of two rods, 26, which are screwed into the yoke member, 18, adjacent the rod, 13, and are detachably connected to the plate, 14, at the other end by means of nuts.

By means of this mounting for the pulley, 10, it will be noted that said pulley may be slidable with the yoke, 18, along the rods, 13, against the action of the springs, 16, which serve normally to hold the pulley toward the outer end of the frame. Furthermore, the axis, 12, may be adjusted laterally on the rod, 20, and the rod, 20, may itself be adjusted vertically in the slots, 23, thereby allowing each end of the shaft, 20, to play in either direction, for purposes of adjustment.

At the opposite, or front, end of the frame, the pulley, 11, is mounted on four rods, 27, connecting the transverse frame members, 3 and 4, in a manner similar to the mounting of pulley 10. The pulley, 11, is, however, not adjustable, except in a very limited extent longitudinally of the rods, 27. The pulley, 11, is fixed to a shaft, 28, which is rotatable in a common type of yoke-bearing, 29. This yoke-bearing is provided with end members which have openings to receive the rods, 27, upon which the yokes are fixed by nuts, 30. The hub on one side of the pulley is provided with a beveled gear, 31, by which the pulley may be actuated from a source of power.

Mounted upon the rods, 27, and on the same side of the frame as the gear, 31, is a small, but powerful, electric motor, 34, which has a rotating power shaft, 32, the outer end of which is provided with a small bevel gear, 33, adapted to mesh with and propel the gear, 31, and the hub of the pulley, 11, thereby driving the saw. The electric current for the motor is furnished from any convenient source of supply, but in my invention it is contemplated to mount a gas engine and an electric dynamo on a truck which may be hauled into the woods and serve to furnish sufficient current to run the motor. The wire from the dynamo to the motor may be of any desired length, and extensible, by ordinary means, as desired.

The insulated wire, 36, connects the motor to a switch, 37, by means of which the current may be turned on or off, as required by the operator.

Each pair of transverse frame members, 4, are braced apart by means of cross-rods, 7', to reinforce the frame. The parts, 4, are connected also at their outer ends by a flat bar, 38. Mounted midway of this bar and projecting outwardly thereof are two adjacent pins, 39, on which are mounted two guide rollers, 40 and 41. These rollers are of metal, and one roller, 41, is provided at its inner side with a broad flange, 42, which is wide enough to span the narrow space between the rollers and to project slightly beneath the inner end of the roller, 40, as may be seen in Fig. 3. These rollers furnish a guide for the moving band saw, and serve to turn the blade of the saw from its position at right angles to the plane of the frame so that the cutting edge is presented outwardly in the plane of the frame. The flange, 42, serves as a backing for the saw blade when it is pressed against the work to prevent its being forced off the guide rollers.

To protect the working parts of the device, a length of sheet iron is provided at each end of the frame. This covering is of the width of the double frame, and is hinged at one side as at 44 to the truss member, 6, and extends downwardly at the end of the frame to make a detachable connection with the supports, 8. To protect the operating parts in the prostrate position of the frame, a skid or flat bar of metal, 45, is attached at each end thereof and on the side opposite the motor, each skid being spaced outwardly from and parallel to the transverse members, 3.

When it is desired to remove the saw from the pulleys, 10 and 11, the operator removes the detachable protecting sheets, 43. He then pushes inwardly on the pulley, 10, against the springs, 16, and thereby loosens the band saw. He then slips the saw from the pulleys, withdraws it from between the lower guide rollers, 40 and 41, and is then enabled to slip the saw around the ends of the frame and upward between the two truss members, 6, and off from the pulleys, D. There are no cross braces between the two parts of the double frame above the saw in its operative position in the frame, the braces being purposely arranged in this manner in order to provide for the quick removal of the saw blade when desired.

In the operation of this device the frame may be laid on its side on the ground next to the tree to be felled. The end supports, 8 and 9, furnish means by which the operator may handle the saw. When the saw has been adjusted in position, the current is turned into the motor by means of the switch, 37. The operation of the motor acts through the gears 33 and 31, to operate the pulley, 11, and also the saw, A. The saw is then advanced against the tree a few inches from the ground and the tree is soon severed.

In sawing up fallen timber, the saw is placed in upright position at the desired point, the operator grasping the handles, 8, at the rear end of the frame, while the front end of the frame rests on the ground, supported by a rocker, 9. The saw is then lowered into contact with the fallen tree, and the sawing operation speedily performed. One man alone can handle my device, except when it is being moved from place to place. The machine is light in structure and rapid in operation and economical in use. There is a great saving in labor and material and because of its reliability the lumberman is not so dependent upon labor with its uncertainties.

Having described my invention, what I claim is new, and desire to protect by Letters Patent is:

1. A portable band cross-cut saw, comprising a rectangular flat double framework, each side part composed of two transverse end members, an upper longitudinal braced member connecting said end members, pulleys mounted adjacent each end member and between the two side parts composing the double frame, smaller pulleys on the longitudinal members, guide rollers on the lower part opposite the small pulleys, a band saw running over the pulleys and between the guide rollers, said rollers serving to turn the blade of the saw so as to present a cutting edge in the plane of the frame and a motor mounted in the frame.

2. A band saw for lumbering, comprising a portable frame, pulleys mounted on each end thereof, a band saw operating over said pulleys, and running between guides on one side thereof serving to deflect the blade of said saw so as to present a cutting edge at right angles to the axes of the pulleys, means mounted in said frame to operate the saw, said frame being provided with supporting rods on the ends and one side thereof adapting the saw to operate in any position for sawing trees erect or in a horizontal position.

3. A device of the kind described, comprising a portable frame, supporting rods on the sides and end of said frame, a band cross-cut saw mounted thereon, a motor on the frame, the cutting part on the saw being presented outwardly in the plane of the frame, and adapted to be supported on its side to sever a tree in one straight cut close to the ground.

4. A power-driven cross-cut saw comprising two large pulleys mounted in a portable frame, a band saw on the pulleys, guides for directing the saw blade outwardly on one side in the plane of the frame, pulleys for deflecting the saw blade out of the way of the tree on the opposite side of the frame, a motor mounted in the frame, a curved support or rocker for the frame adapting the saw for convenient use in any position.

5. In a device of the kind described, a portable longitudinal framework comprising two parallel frames spaced slightly apart, and connected along one run of the saw, a pulley at each end of said framework and between the said frames, a band saw mounted on said pulleys, guides for said saw to turn the other run of the blade thereof to cut in the plane of the framework, a motor mounted on one of said frames, and supporting and protecting rods adapted to support the saw operatively in prostrate or erect position.

In testimony whereof, I hereunto affix my signature this the 11 day of July, 1917.

H. W. HOWLAND.